UNITED STATES PATENT OFFICE.

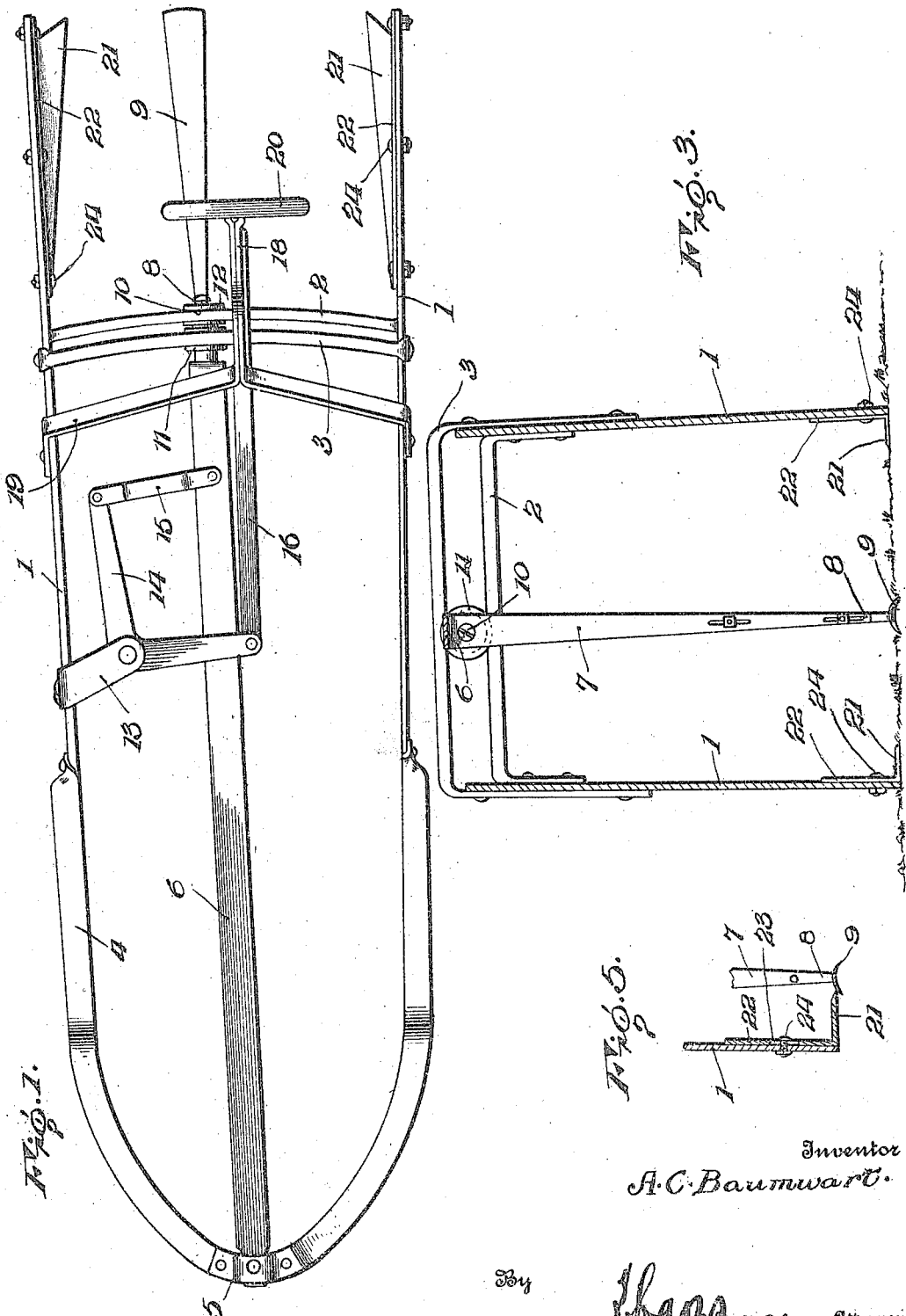

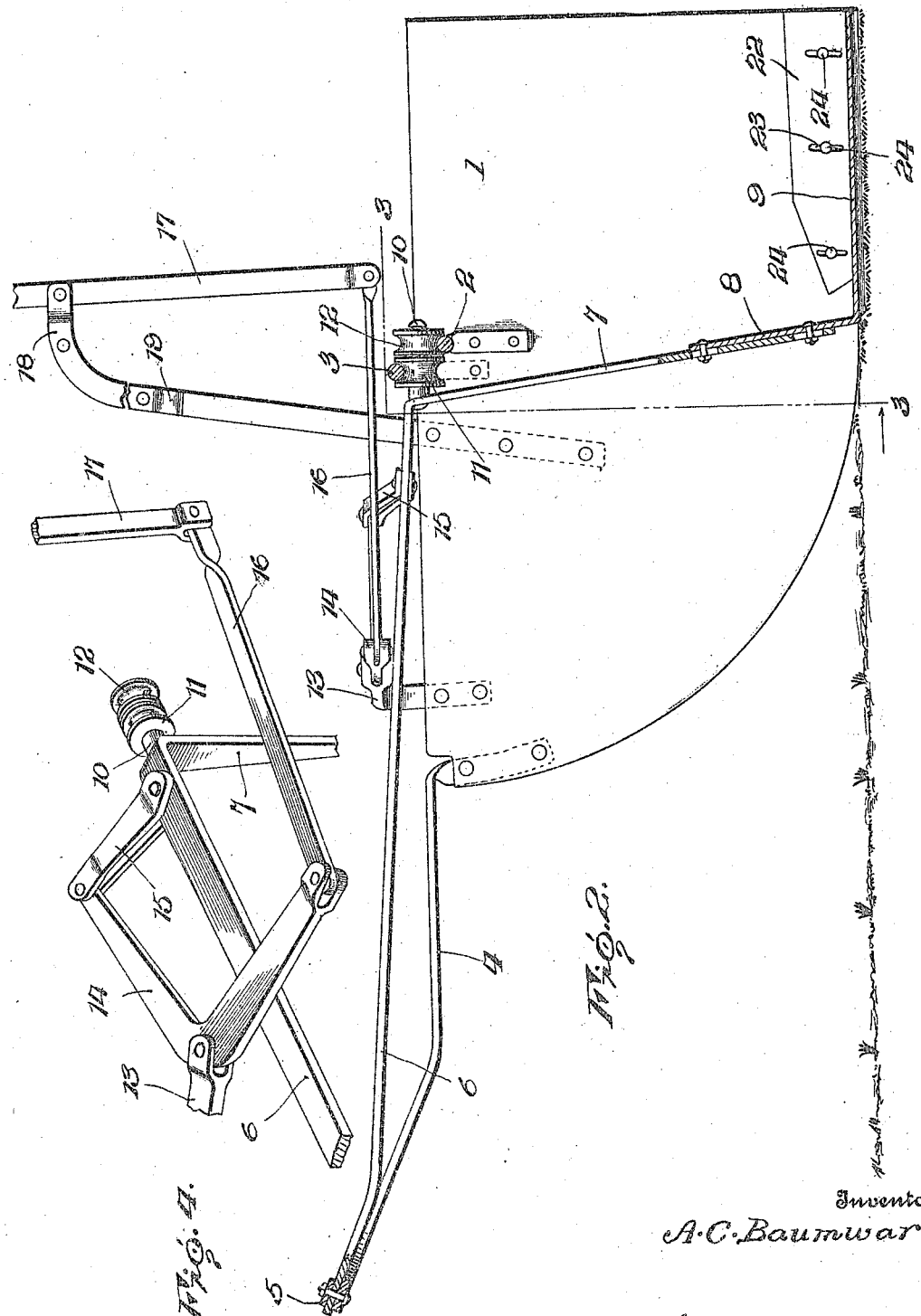

ARTHUR C. BAUMWART, OF CANUTE, OKLAHOMA, ASSIGNOR OF ONE-THIRD TO CHARLES H. WILCOX, OF CANUTE, OKLAHOMA.

COTTON-CHOPPER.

1,233,745.

Specification of Letters Patent. Patented July 17, 1917.

Application filed March 13, 1917. Serial No. 154,555.

*To all whom it may concern:*

Be it known that I, ARTHUR C. BAUMWART, a citizen of the United States, residing at Canute, in the county of Washita and State of Oklahoma, have invented certain new and useful Improvements in Cotton-Choppers, of which the following is a specification.

This invention is a cotton chopper attachment for farm implements and is intended more particularly for attachment to riding cultivators, although it may be used in connection with other machines. The object of the invention is to provide a simple and easily operated device by which the driver of a cultivator may at will cut out weak plants in a row so that the more desirable plants may properly develop. The invention also seeks to provide a machine which may readily travel along a row of plants and will respond readily to the movement of the operating lever.

The invention is illustrated in the accompanying drawings, in which—

Figure 1 is a plan view of a chopper embodying my improvements;

Fig. 2 is a central vertical longitudinal section;

Fig. 3 is a transverse section on the line 3—3 of Fig. 2;

Fig. 4 is a detail perspective view of a part of the operating mechanism;

Fig. 5 is a detail section.

In carrying out my invention, I employ a pair of runners 1 which may be of any suitable dimensions so that they may run at opposite sides of a row of plants and serve as fenders to prevent dirt from the cultivator being thrown onto the plants in such quantities as to smother them. Intermediate the length of the runners, I secure to the inner opposed faces of the same a transverse yoke or brace 2 having a convex upper surface and at a point slightly in advance of said yoke or brace, I secure to the outer sides of the runners a similar yoke or brace 3 having a convex under side, the ends or extremities of both yokes being flattened so that they may be secured readily to the runners and have a firm bearing thereagainst. To the upper front corners of the runners, I secure a frame 4 which projects forwardly from the runners and at its forward extremity is constructed with a keeper or eye 5 within which is pivoted the front end of an oscillatory knife arm 6. The rear end of this knife arm is turned down to provide a standard 7 and to the lower end of said standard I adjustably secure the upturned shank 8 of the vibratory knife 9. This knife 9 is sharpened along its side edges and is concave on its under side so that the surface in engagement with the ground will be reduced and the resistance to its forward movement minimized. The knife is disposed to travel just below the surface of the ground and the side edges are swung against the roots of the plants to be cut out so that said plants will be effectually cut off. The knife is tapered toward its forward end, as shown in Fig. 1, and the upturned shank 8 of the same is also reduced toward its lower end so that the junction of the shank and the knife will be as narrow as possible without sacrificing strength and will, therefore, offer the least possible resistance to the travel of the knife. At the upper end of the standard 7 is a rearwardly projecting pin or axle 10 upon which are mounted grooved rollers 11 and 12, the forward roller 11 engaging the under side of the yoke 3 and traveling on the same as a track while the rear roller 12 rides upon the upper side of the yoke 2, the rollers being out of contact with each other and the ends of the axle. The knife bar 6 and the knife are thus guided in their movements and are also supported against either upwardly or downward play, it being noted, of course, that the arched portion of these yokes or braces are slightly curved so as to lie concentric with the pivot of the knife bar. The interposition of the rollers 11 and 12 minimizes friction without in any way detracting from the strength of the support or rigidity of the entire apparatus. Upon one of the runners, near the front end thereof, I secure a bracket 13 which projects inwardly over the edge of the runner, as shown, and to the inner end of the said bracket, I pivot an angle lever 14 which has one arm extending rearwardly and its other arm extending transversely of the device. The rear end of the rearwardly projecting arm is pivoted to one end of a link 15 which has its opposite end pivoted to the knife bar 6 while the inner end of the forward arm of the lever 14 is pivoted to the front end of a link 16 which extends rearwardly therefrom and has its rear end pivoted to the lower end of an operating lever 17. The operating lever is fulcrumed upon the upper end 18 of an arched support 19 which is secured to and rises from the runners and also serves as an additional brace to maintain the runners rigidly in their parallel spaced relation. The operating lever 17 is equipped with a handle 20 at its upper end which handle may be adjusted longitudinally of the lever so as to adjust the device to suit the wishes of the user.

To the inner side of each runner, at the lower rear corner of the same, I secure a blade 21 which is arranged to run at the side of the row and cut through any weeds or trash which may tend to accumulate along the same. These blades are substantially triangular in form so that they present to the roots or plants an edge which gradually extends inwardly from the runner so that it will make a draw cut through the roots and other matter it encounters. These knives 21 are constructed with vertical wings or branches 22 provided with vertical slots 23 through which and the runners securing bolts 24 may be inserted. By providing these slots and securing bolts, the knives may be set to run at any desired depth, as will be readily understood.

The device may be attached to the plow or cultivator beams of any riding cultivator and will be so placed relative to the cultivator that the operating lever will be just in front of the driver's seat and said lever with the parts connected directly thereto are disposed slightly to one side of the longitudinal center of the apparatus in order that they may avoid the braces and connecting rods which are found in various styles of riding cultivators which are extensively used. As the machine is drawn along, the operator, upon observing plants which are not thriving or observing a place where plants are too thick, will vibrate the operating lever and will thereby cause the knife 9 to move to one side so that it will swing against the roots of the plants to be cut out. When the operating lever is swung forwardly or backwardly, the angle lever 14 will be set in motion through the link 16, as will be readily understood, and the motion of the angle lever will be transmitted through the link 15 to the knife bar 6 so that the said bar and the knife 9 will be caused to move laterally in a horizontal plane. The said knife will, by the described movement, be carried toward one or the other of the side knives 21 so that the roots and stems of the plants will be acted upon by both knives as between the members of a pair of shears. When the cultivator blades are raised to permit the machine to be turned at the end of a row, the chopper will also be raised so that a short turn may be made.

Having thus described the invention, what is claimed as new is:

1. In a cotton chopper, the combination of a pair of runners, an arched brace disposed between and secured to the inner sides of the runners, a second arched brace extending over the runners and secured to the outer sides of the same, a knife bar pivotally supported at its front ends to the runners and having its rear end supported and guided by the arched braces, a knife carried by said knife bar, and coacting knives secured on the inner faces of the runners.

2. A cotton chopper comprising a pair of runners, an arched brace secured to and extending between the inner sides of the runners, a second arched brace secured to the outer sides of the runners and extending over the same, a vibratory knife disposed between the runners, means carried by the runners for operating said knife, and traveling supports for the knife disposed between and engaging said arched braces.

3. A cotton chopper comprising a pair of runners, a frame secured to and projecting forwardly from the front ends of the runners, a knife bar pivoted at its front end to said frame, a knife carried by the rear end of said knife bar, arched braces secured respectively to the inner and the outer sides of the runners and connecting the same, and a traveling support projecting from the knife bar between and engaging said braces.

4. A cotton chopper comprising a pair of runners, spaced tracks secured to and extending between the runners, a knife bar pivotally supported at its front end from the front end of the runners, a knife carried by the rear end of said bar, a pin projecting from said knife bar between said tracks, and rollers carried by said pin and riding upon the upper and the lower surfaces of said tracks respectively.

5. A cotton chopper comprising a pair of runners, a frame projecting from the front ends of the runners, a knife bar pivoted at its front end upon said frame, an angle lever pivotally supported upon one of the runners, a link connecting one end of said lever with the knife bar, an operating lever mounted upon the runners, and a link connecting the operating lever with the inner end of the angle lever.

6. A cotton chopper comprising a pair of runners, an oscillatory knife bar supported from the ends of said runners, means supported on the runners for oscillating said bar, a standard at the rear end of said bar, and a knife secured to said standard and tapered toward its front end.

7. A cotton chopper comprising a pair of runners, a knife bar supported from said runners and having a depending tapered rear end, a forwardly tapered knife having an upstanding shank at its front end secured to the depending tapered end of the knife bar, and means supported on the runners for oscillating said knife bar.

8. A cotton chopper comprising a pair of runners, vertically adjustable knives secured to the inner sides of said runners and projecting inwardly therefrom and having their edges inclined forwardly toward the runners, a vibratory knife disposed between the runners and having forwardly converging side edges, and means supported on the runners for supporting and vibrating said knife.

In testimony whereof I affix my signature.

ARTHUR C. BAUMWART. [L. S.]

Copies of this patent may be obtained for five cents each, by addressing the "Commissioner of Patents, Washington, D. C."